Jan. 5, 1960     T. J. LORD ET AL     2,919,711
TANK PRESSURIZING IN AERIAL CRAFT
Filed March 19, 1958
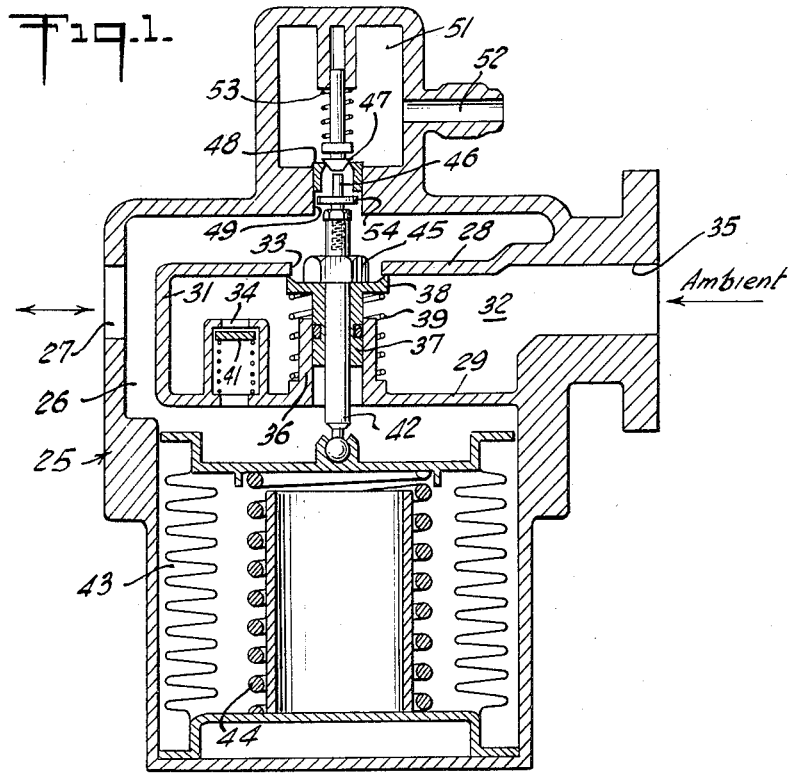
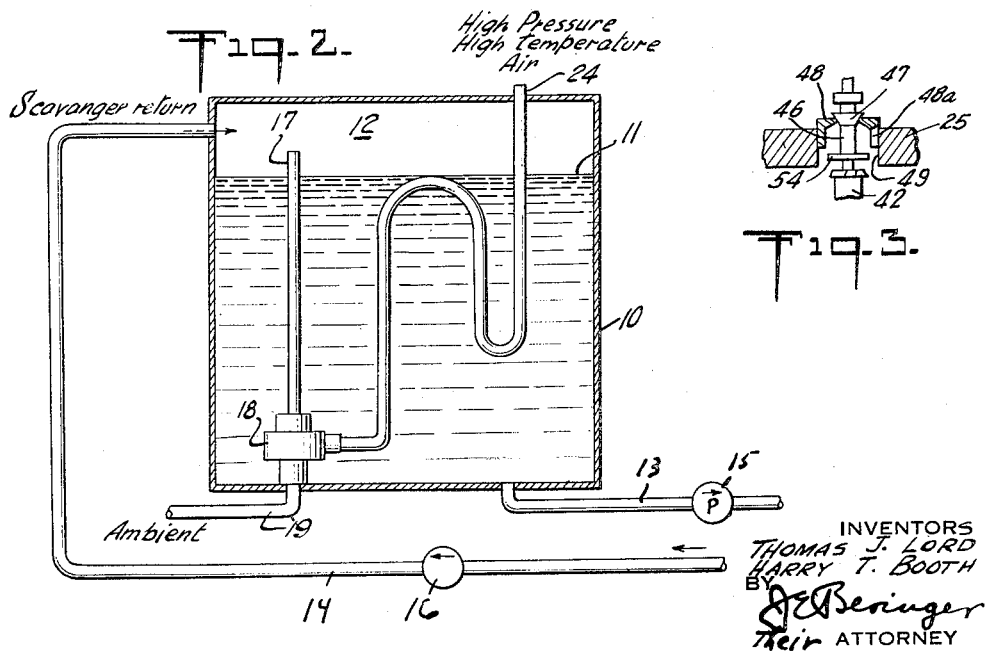
INVENTORS
THOMAS J. LORD
HARRY T. BOOTH
BY
*J. E. Beringer*
Their ATTORNEY

United States Patent Office 2,919,711
Patented Jan. 5, 1960

2,919,711

TANK PRESSURIZING IN AERIAL CRAFT

Thomas J. Lord, Middletown, and Harry T. Booth, Dayton, Ohio, assignors to United Aircraft Products, Inc., Dayton, Ohio, a corporation of Ohio Application March 19, 1958, Serial No. 722,563

6 Claims. (Cl. 137—81)

This invention relates to the maintaining of specific air pressures in closed containers, and, although not so limited, has special reference to liquid storage tanks in aerial craft.

According to the objectives of the invention, an internal tank pressure is established which is the same as ambient pressure at altitudes up to a selected level; above this altitude a constant pressure equivalent to that at the selected altitude being maintained irrespective of further decreases in ambient pressure.

Another object of the invention is to utilize high pressure air from a jet engine compressor to pressurize a tank as described and in a manner to obviate problems which may arise from excessive heat in the air.

A further object of the invention is to present a generally new pressurizing valve which may be installed inside or outside a tank and which will function automatically to control the internal pressure of the tank, relieving excess pressure and compensating for losses of pressure, all as may result from operation of a system of which the tank is a part.

Other objects and structural details of the invention will appear from the following description when read in connection with the accompanying drawing, wherein:

Fig. 1 is a partly diagrammatic view in longitudinal section of a pressurizing valve in accordance with the illustrated embodiment of the invention;

Fig. 2 is a diagrammatic view of a part of a tank pressurizing system in accordance with the illustrated embodiment of the invention; and Fig. 3 is a detail view, somewhat enlarged with respect to Fig. 1, of a portion of the control mechanism of Fig. 1.

The invention is disclosed as embodied in a jet engine driven aircraft, and particularly in connection with the storage tank which holds the engine lubricant supply and from which the lubricant constantly is withdrawn and returned during engine operation. Thus, an oil storage tank of the kind described is represented in Fig. 2 as a container 10 closed on all sides except for various pipe connections leading to and from it. The tank 10 contains oil, having a normal level 11 which provides an air space 12 in the upper part of the tank interior. Oil is conducted from the tank by way of a pipe line 13 and returned by pipe line 14, it being understood that the movement of the oil to and from the engine is a pressure induced operation resulting, for example, from the operation of respective engine driven pumps 15 and 16. The returning oil entrains varying amounts of air and it is desirable to rid the tank of the air released from the oil in order to avoid an unregulated pressurizing of the tank. To this end, the space 12 above the liquid level normally is vented by a stand pipe 17 having one end extending above the liquid level into the space 12 and connected at its other end through a pressurizing valve 18 with an external pipe line 19 leading overboard or to a place of ambient pressure. The vent pipe 17 is here shown as a relatively stationary stand pipe but in accordance with known practices of the art the vent might instead be comprised in a pipe member forming part of a pendulum assembly and leading to the valve 18 through another and stationary pipe. Utilizing a pendulum assembly of the kind indicated, a storage tank as described can be vented in all positions or flight attitudes. Pendulum mechanisms as here schematically described are known in the prior art, for example in the patent to F. E. Carroll, Jr. et al. No. 2,800,975 wherein the part 45 corresponds with the present pendulum type member and wherein the part 43 corresponds to the present stationary pipe.

Other connections may in a typical embodiment of a liquid storage tank as disclosed be present but only one other is here disclosed, namely a pipe line 24 which extends from the engine compressor to the interior of the tank 10 and supplies high pressure, high temperature air to the valve 18 for a purpose hereinafter more clearly to appear.

The valve assembly 18 is in the illustrated embodiment contained within the tank 10 although it might of course be mounted outside the tank. As shown in Fig. 1, it comprises a body 25 having a main interior chamber 26 which communicates through an opening 27 with one end of the vent line 17 and hence is in constant communication with the space 12 above the liquid level. Partly intersecting the chamber 26 is a pair of spaced apart walls 28 and 29 integrally formed with the body 25 and interconnected by a vertical wall 31 in such manner as to define a chamber 32 closed from communication with the chamber 26 except through openings 33 and 34 in a manner later to be described. The chamber 32 communicates through an opening 35 with the exterior of the tank and overboard vent line 19. The wall 29 provides a central through bore 36 which receives a sleeve 37. On the projecting end of the sleeve 37 is a laterally flaring valve portion 38 adapted to seat on the underside of wall 28 in a manner to close opening 33 therein. A spring 39 urges the valve 38 to a closed position. A spring urges check valve 41, closes the opening 34 and is arranged to open in response to a predetermined high pressure in the chamber 32 in reference to the pressure in chamber 26.

The valve sleeve 37 has a sliding mounting on a rod 42 which extends respectively above and below the spaced apart walls 28 and 29. The projecting lower end of the rod 42 has a jointed connection with one end of an evacuated bellows assembly 43 secured at its other end to the bottom of the body 25. The bellows assembly 43 is in effect disposed in or contained within the chamber 26 and its exterior is subjected to the pressure in such chamber. A spring 44 in the bellows assembly aids in expansion of the bellows when the external pressure is reduced. Above the valve 38, on the rod 42, is a nut 45 providing a limit stop for the valve 38 and adjustable on the rod to obtain a selected initial position of the valve relatively to the rod and to the bellows to which it is connected. Above the nut 45, the adjacent end of the rod 42 has a tapped recess receiving one end of a probe 46. The latter tends to engage the underside of a poppet valve 47 seated in and closing a small diameter opening in a sleeve 48. The latter is in turn mounted in an axially displaceable manner in a through bore 49 in the body 25 interconnecting the chamber 26 with an upper chamber 51 communicating through a passage 52 with the line 24 bringing high pressure, high temperature air to the valve assembly. The poppet valve 47 normally is held seated by a compression spring 53. The sleeve 48 is adapted to be displaced by a laterally disposed abutment member 54 on the probe 46, the sleeve 48 having a cut away configuration providing slots 48a (Fig. 3) in such manner that the partial elevation thereof from the bore 49 provides for a free communication between the chambers 26 and 51. The opening of poppet valve 47, on the other hand, provides for relatively restricted communication between the chambers 26 and 51, the passage controlled by this valve through the sleeve 48 being relatively small.

In the operation of the system, at sea level the evacuated bellows assembly 43 is contracted, as a result of relatively high pressure in the chamber 26, as a result of which rod 42 is retracted to hold valve 38 from its seat on wall 28. Accordingly, the chamber 26 and the air space 12 within the tank 10 are connected through valve opening 33 and pipe 19 to ambient pressure. The poppet valve 47 and sleeve 48 are both closed at this time. As long as the bellows assembly remains compressed, and valve 38 remains open, the interior of the tank is vented and the pressure in space 12 remains at the same pressure as the ambient pressure.

As altitude is increased, and the ambient pressure decreases, the bellows assembly 43 expands in an axial direction to extend the rod 42 upwardly or outwardly. Constrained by the spring 39, the valve 38 follows the movement of rod 42 and nut 45 thereon. As a selected pressure, corresponding to a certain altitude, the movement of the bellows and associated parts is sufficient to cause valve 38 to seat upon the wall 28 thereby closing opening 33 and discontinuing the communication of chamber 26 with ambient pressure. Chamber 26 continues to be connected to the space 12 within the tank, however, so that the bellows assembly 43 now may be considered to sense tank pressure rather than altitude pressure. The parts will remain so positioned until a predetermined change in the tank pressure occurs. Should this pressure rise, as it might do on account of air being brought in to the system through the scavenge or return lines, the bellows assembly will be compressed and reopen valve 38, permitting the excess pressure to exhaust through opening 33. However, should the tank pressure continue to decrease, the bellows and rod 42 are further extended and the probe 46 on the end of the rod is brought into contact with the underside of the poppet valve 47. When continued extension of the bellows unseats the valve 47, high pressure, compressor bleed air enters through the middle of sleeve 48 and makes its presence felt in the chamber 26 of the valve and in the communicating space 12 within the tank. Should the tank pressure nevertheless continue to drop, a further bellows extension takes place causing the part 54 to engage and displace the valve sleeve 48. A greater open flow area thus is provided for the high pressure air so that the tank pressure is enabled quickly to regain its selected minimum pressure. As the tank pressure rises as a result of admitting high pressure air thereto, the bellows assembly 43 recontracts and the system returns to equilibrium with the valves closed. Should additional pressure be required, the bellows will again extend and open the valves 47 and 48 as described.

As altitude is lost, and the ambient pressure rises, the bellows assembly 43 is required again to sense ambient pressure in order to open valve 38 and revent the tank interior. This is accomplished by the check valve 41. When ambient pressure, admitted through opening 35, exceeds the tank pressure, valve 41 unseats, transmitting the ambient pressure to the bellows. Under the pressure thereof the bellows contracts and valve 38 is opened, venting the tank to opening 35.

Fine adjustment for the venting or shut-off point for valve 38 is made as noted through adjustment of the nut 45. The cracking point for the high pressure valve mechanism is made by a screw adjustment of the probe 46 on the end of the rod 42.

The compressor bleed air introduced into the system by way of opening 52 will ordinarily be at a very high temperature, as on the order of 900° Fahrenheit. To obviate the undesirable results which may flow from exposing rubber seals and other materials in the pressurizing valve to such high temperatures, the pipe 24 which conducts the high pressure fluid to the valve is caused to pass through the contained liquid in the tank 10. The wall of tube accordingly acts as a heat exchanger, conducting some of the heat of the air within the tube to the relatively cool liquid outside the tube in the tank. As indicated, the passage of the tube or pipe through the tank may be made circuitous for a more thorough and effective reduction in air temperature before the air reaches the pressurizing valve 18.

As noted in the introductory description thereof, Fig. 1 is diagrammatic. For purposes of assembly, adjustment and accuracy of valve seating it will be understood that the unitary housing 25 will in the actual embodiment of the invention have a fabricated, multiple part construction.

What is claimed is:

1. In a tank pressurizing system for aerial craft, a tank, a source of pressure fluid, and a valve assembly operating in response to applied pressure differentials to control communication of said tank with said source and with ambient pressure, said valve communicating ambient pressure to said tank until the ambient pressure drops below a predetermined value whereupon in successive steps said tank is closed from communication with ambient pressure and is connected to said source of pressure fluid, the connection from said tank to said source being interrupted in response to a pressure rise in said tank above a predetermined value, and said tank being again communicated with said ambient pressure as said ambient pressure returns to a value above said predetermined value.

2. In a tank pressurizing system for aerial craft, a tank, a source of pressure fluid, and a valve assembly controlling communication of the tank interior with said source of pressure fluid and with ambient pressure, said valve assembly normally closing said tank from communication with said source and opening it to ambient pressure, an air pressure responding device in said valve assembly constantly exposed to the interior tank pressure, said device closing said tank from communication with ambient pressure and opening it to said source as said ambient pressure is reduced below a predetermined value, and means to expose said device to ambient pressure as said ambient pressure rises above said predetermined value.

3. In a tank pressurizing system for aerial craft, a liquid storage tank, a source of pressure fluid, a valve assembly to connect the tank interior above the liquid level therein alternatively to said source and to ambient pressure, and means to connect said source to said valve assembly including a conduit extending through the contained liquid in said tank for heat transfer through the wall of said conduit.

4. A system according to claim 3, characterized in that said conduit follows a circuitous path through said tank beneath the liquid level therein.

5. A system according to claim 3, characterized in that said valve assembly is located within the tank, connected to the interior of the tank above the liquid level and to ambient pressure outside the tank, said conduit extending from outside the tank and following a circuitous route within the tank beneath the liquid level to said valve assembly.

6. In a tank pressurizing system for aerial craft, a tank, a source of pressure fluid, a valve assembly to communicate the tank interior alternatively with said source and with ambient pressure, an air pressure responsive device in said valve assembly affected by the air pressure in said tank, a valve actuator movable with said device, a valve controlled by said actuator to close said tank from communication with ambient pressure in response to a lowering tank pressure, another valve opened by said actuator in response to a continued lowering of said tank pressure for restricted communication of the tank interior with said pressure fluid source, a further valve opened by said actuator in response to a further continued lowering of tank pressure for relatively unrestricted communication of the tank interior with said source, and a check valve opened by a predetermined rise in ambient pressure over tank pressure to admit ambient pressure to said device to reopen the first mentioned valve and communicate said tank interior to ambient pressure.

References Cited in the file of this patent

UNITED STATES PATENTS

| | | |
|---|---|---|
| 2,049,984 | Vorech et al. | Aug. 4, 1936 |
| 2,201,513 | Ackerman | May 21, 1940 |
| 2,416,091 | Fitch | Feb. 18, 1947 |
| 2,568,114 | Cornelius | Sept. 18, 1951 |
| 2,747,597 | Keckler | May 29, 1956 |